(12) United States Patent
Gillooly

(10) Patent No.: US 9,759,457 B1
(45) Date of Patent: Sep. 12, 2017

(54) CONTROLS SOLUTION FOR PRIMARY-SECONDARY CHILLER PLANT

(71) Applicant: Amazon Technologies, Inc., Reno, NV (US)

(72) Inventor: Alan Donald Gillooly, Auburn, WA (US)

(73) Assignee: Amazon Technologies, Inc., Reno, NV (US)

( * ) Notice: Subject to any disclaimer, the term of this patent is extended or adjusted under 35 U.S.C. 154(b) by 725 days.

(21) Appl. No.: 13/653,355

(22) Filed: Oct. 16, 2012

(51) Int. Cl.
*F25D 17/02* (2006.01)
*F25B 17/02* (2006.01)

(52) U.S. Cl.
CPC .................. *F25B 17/02* (2013.01)

(58) Field of Classification Search
CPC .. F24F 5/00; F24F 11/02; F24F 11/008; F28F 27/00; F25B 41/062; F25B 49/022; F25B 13/00; G05D 23/128

USPC .................................................... 62/129, 185
See application file for complete search history.

(56) References Cited

U.S. PATENT DOCUMENTS

| 4,463,574 A | * | 8/1984 | Spethmann et al. ............ 62/175 |
| 5,946,926 A | * | 9/1999 | Hartman ........................ 62/201 |
| 6,666,042 B1 | * | 12/2003 | Cline ...................... F24F 3/065 62/175 |
| 7,028,768 B2 | * | 4/2006 | Aler et al. .................... 165/219 |

FOREIGN PATENT DOCUMENTS

| JP | H07332714 A | * | 12/1995 |
| JP | WO2010092916 A1 | * | 8/2010 |

* cited by examiner

*Primary Examiner* — Larry Furdge
(74) *Attorney, Agent, or Firm* — Kilpatrick Townsend & Stockton LLP

(57) ABSTRACT

Methods for and systems of controlling operation of one or more chillers in a primary-secondary chiller plant system. The chillers utilize a set point temperature that is based upon measuring a temperature of water at a supply side of the load on the secondary loop.

16 Claims, 10 Drawing Sheets

US 9,759,457 B1

CONTROLS SOLUTION FOR PRIMARY-SECONDARY CHILLER PLANT

BACKGROUND

A primary-secondary variable flow design chiller plant includes a piping loop for chillers that is hydraulically separate from a piping loop for the system or load (coils). The piping loop for the chillers is known as the "primary loop" and the piping loop for the system or load is referred to as the "secondary loop." The two loops share a small section of piping known as "common pipe," also known as a "decoupler pipe." Depending on which loop has the greater flow rate, the flow direction in the decoupler pipe changes. The primary loop pumps are usually constant volume, low-head pumps intended to carry a low constant flow through the chiller's evaporator. The secondary loop pumps deliver the chilled water from the common pipe to the cooling loads and then back to the decoupler pipe.

Usually, it is desirable to have the flow rate in the primary loop equal to or greater than the flow rate in the secondary loop. If the flow rate in the primary loop is greater than the flow rate in the secondary loop, then some of the cold water supplied by the chillers is bypassed through the decoupler pipe to the return side of the chillers and the cold bypass water mixes with the return water from the secondary loop and, as a consequence, the temperature of the return water drops. This water is then pumped back to the chiller.

When the secondary flow exceeds the primary flow, return water from the system secondary loop flows back through the decoupler pipe and gets mixed with the supply water from the chillers. The mixed water then loops back through the primary loop. The water that returns through the secondary loop and returns to the secondary loop causes the temperature of the supply water to the secondary loop to increase, which has some unwanted consequences. For example, if the temperature of the water returning from the secondary system is lower than the design temperature, the chillers cannot be loaded to their maximum capacity. This situation is known as "low delta-T syndrome." This "low delta-T syndrome" results in greater pump, chiller and cooling tower energy consumption, and reduction in cooling plant capacity.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A chiller plant normally consists of evaporator pumps, chillers, condenser pumps, and cooling towers. A primary-secondary variable flow design chiller plant includes a piping loop for chillers that is hydraulically separate from a piping loop for the system or load (coils). The piping loop for the chillers is known as the "primary loop" and the piping loop for the system or load is referred to as the "secondary loop." Embodiments herein are directed to systems and methods for controlling a primary-secondary chiller plant, and more specifically control of the chillers. The chillers can be operated, in embodiments, based upon information about the secondary loop, such as supply (e.g., inlet) water temperature at the load. Prior art systems use a set temperature based upon supply water exiting the chillers, which works well for fully loaded, balanced conditions in the chiller plant, but sometimes results in low delta-T syndrome or other issues for partial load situations.

In embodiments, the set temperature of the chillers is determined based upon a desired temperature of the supply water to the load, as opposed to the temperature of the supply water supplied by the primary loop. By basing the set temperature on the secondary loop supply temperature, flow rates and temperatures in the decoupler pipe can be accounted for. In this manner, low delta-T syndrome can be avoided, and water supplied by the chillers is chilled sufficiently to account for flow through the decoupler pipe. Thus, overpumping in the secondary loop is avoided, and efficiency of the system is maintained, even in a partial or very low load situations.

Figure 1:
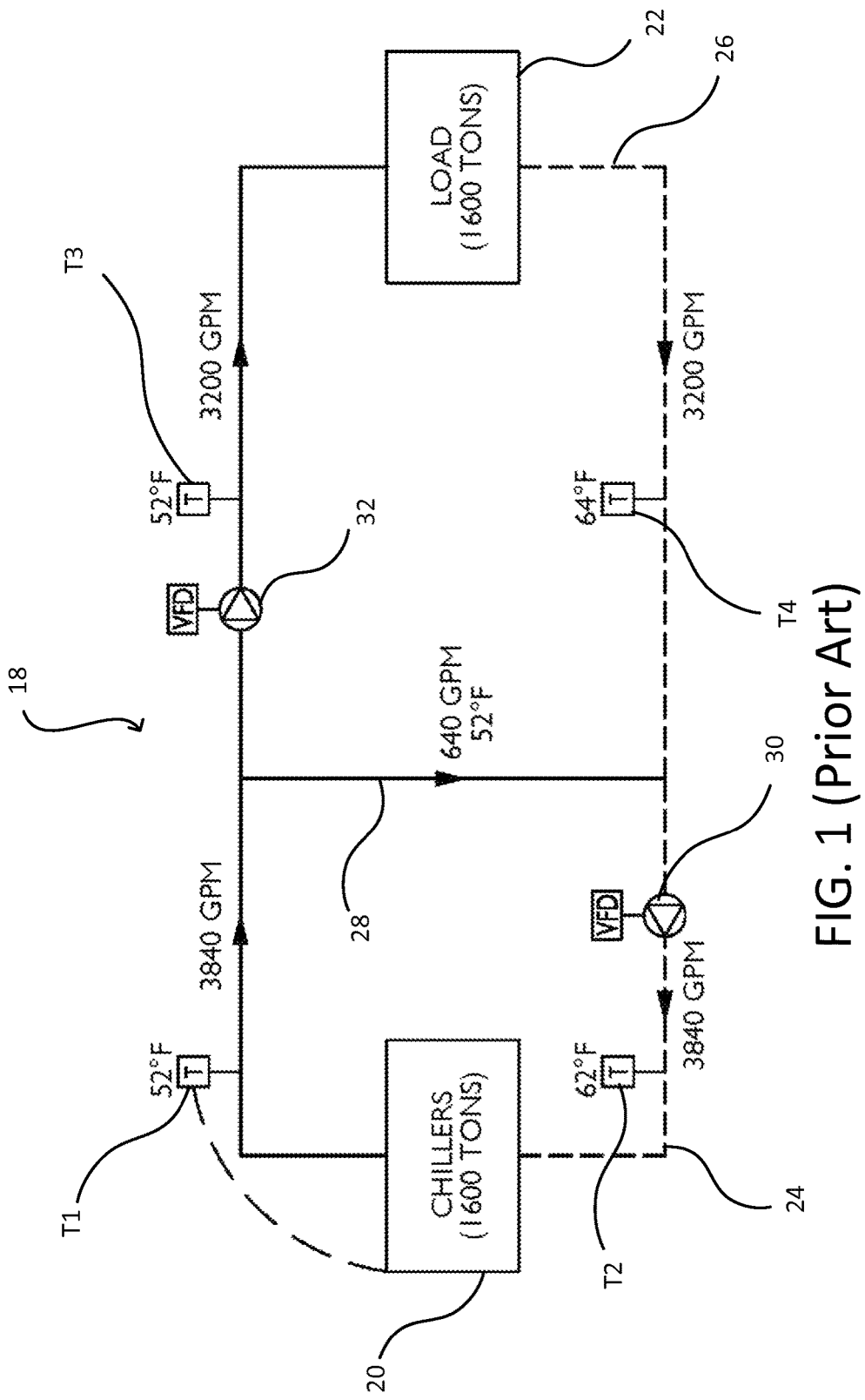
FIG. 1 is a diagrammatic representation of a prior art primary-secondary flow design for a chiller plant system, with the system fully loaded.

FIG. 1 is a diagrammatic representation of a prior art primary-secondary flow design for a chiller plant 18. The chiller plant 18 includes one or more chillers 20 that provide cooled water for cooling of a load 22. The chiller plant 18 can include multiple chillers 20, connected in parallel, as is known in the art. The load 22 can be a building, a data center, or other structures or features for which heat removal is desired. The load 22 typically includes coils for providing a cooling effect. The primary-secondary chiller plant 18 shown in FIG. 1 includes a primary loop 24, on the left side of the figure, and a secondary loop 26, on the right side of the figure. The primary loop 24 is for the chillers 20, and secondary loop 26 is for the load 22.

The primary loop 24 and the secondary loop 26 share a common pipe, called a common, or decoupler pipe 28. As used herein, a flow of water through the decoupler pipe 28 in the downward direction shown by the arrow on the decoupler pipe in FIG. 1 is a "positive" flow of water in the decoupler pipe. Flow in the opposite direction, or upward in the figure, is a "negative" flow (shown by the arrow on the decoupler pipe 28 in FIG. 3). Lack of flow in the decoupler pipe 28 is referred to as "neutral" flow.

The primary loop 24 includes a pump 30, which may be, for example, a variable speed pump as controlled by a frequency drive (VFD). The pump 30 may alternatively be a constant volume, low head pump intended to provide a constant flow through the evaporator for the chillers 20. The secondary loop 26 includes a pump 32, which delivers chilled water from the primary loop 24 to the load 22 and then back to the primary loop 24. The secondary pump 32 is typically a variable speed pump, such as variable speed pump as controlled by a VFD, and is typically controlled from differential pressure sensors located in the system or from cooling coil valve positions.

The primary-secondary chiller plant flow design in FIG. 1 includes example flow rates and temperatures for a fully loaded system. In the example shown, the system is running under a full load, and at designed operating conditions. In primary-secondary flow designs, the cooling load is balanced so that it is equal between the primary and secondary loops. In general, the cooling load for each of the loops is determined by the following formula:

Cooling load=($\Delta T$)(flow)(specific heat of water)

Assuming specific heat of water is constant, or at least does not change appreciably, then:

Cooling load(primary)=cooling load secondary($\Delta T$-primary)(flow-1)(specific heat of water)=($\Delta T$-secondary)(flow-2)(specific heat of water)

Where flow-1 and flow-2 are the flow rates in the primary and secondary loops, respectively, and $\Delta T$ is the change in temperature between the supply side and return side of a loop and flow is the flow in the loop. The specific heat of water cancels each side, and thus:

($\Delta T$-primary)(flow)=($\Delta T$-secondary)(flow)

In embodiments herein, temperature is described in Fahrenheit, but other units may be used. In addition, flow rate is described in gallons per minute (GPM), but again, different units may be used.

For the system in FIG. 1, the flow rate in the primary loop 24 is 3,840 gallons per minute (GPM). The change in temperature ($\Delta T$) across the chillers 20 (T1 to T2) is 10° F. The secondary loop 26 has a change of temperature ($\Delta T$) of 12° F. (T3 to T4), and a flow rate of 3,200 GPM. Thus, the system is balanced, because (10)(3840)=(12)(3200). The additional flow of water in the primary loop over the flow amount in the secondary loop creates a positive flow of 640 GPM across the decoupler pipe 28. This system permits the primary-secondary chiller flow design of FIG. 1 to operate within the design of the system, or a 12 degree drop across the load. Thus, a chiller plant with a 10 degree drop provides cooling of a 12 degree drop across the load.

In the prior art design of FIG. 1, the chillers 20 operate based upon a set temperature sensed at the supply side of the primary loop 24 (e.g., at or near T1), as indicated by the dotted line between T1 and the chillers. Operating the chillers 20 utilizing a set temperature taken at the position T1 is standard in prior art primary-secondary chiller flow designs.

Figure 2:
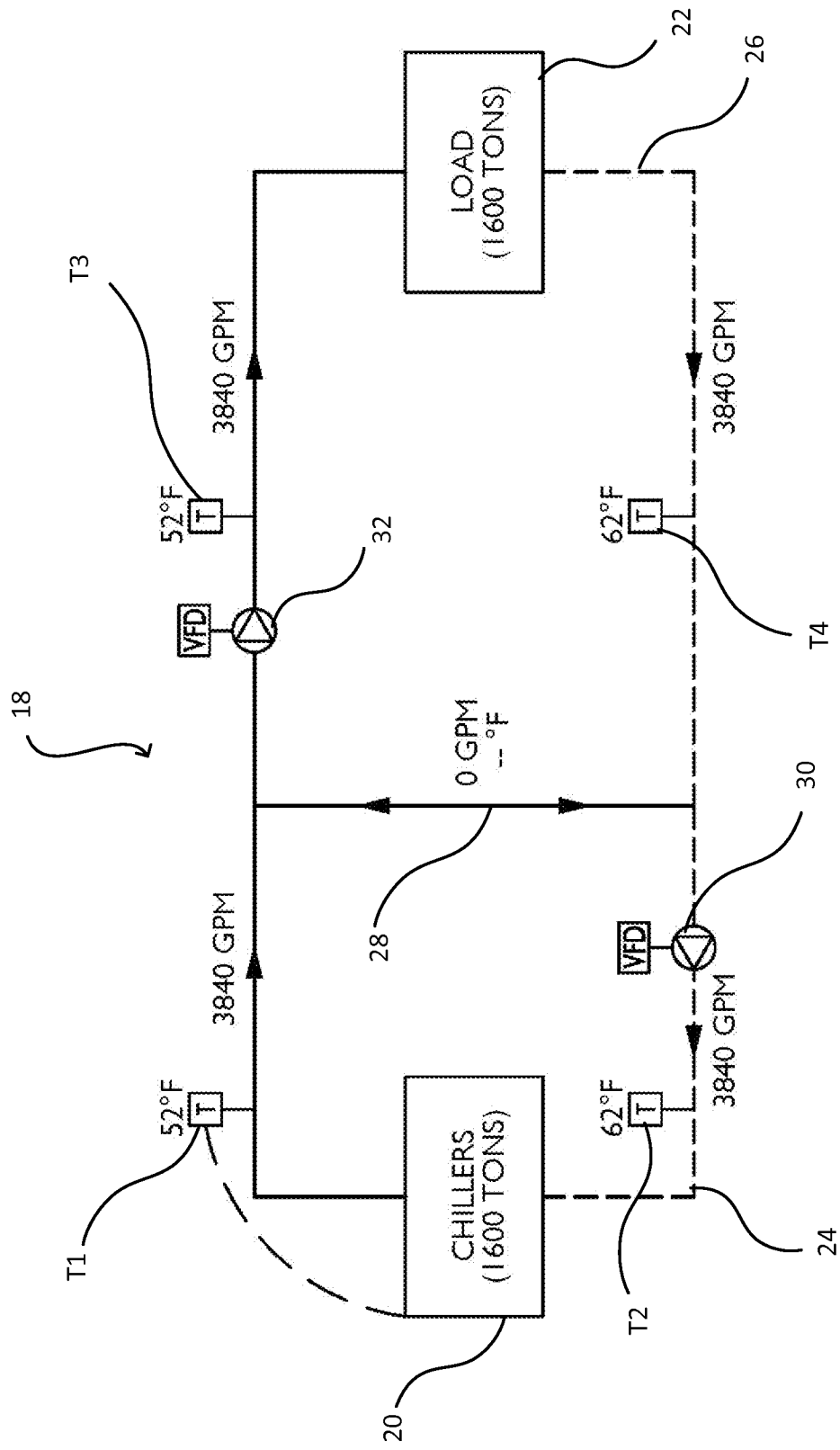
FIG. 2 is a diagrammatic representation of the system of FIG. 1, with a decoupler pipe for the system in a neutral state.

FIG. 2 shows the system of FIG. 1 with the decoupler pipe 28 in a neutral state, due to a partial load situation. In this system, the change in temperature in the primary loop 24 is the same as the change in temperature of the secondary loop 26, with both being 10° F. From the equation above, because the temperature drop is the same across both loops, the flow rate through the secondary loop is equal to the flow rate in the primary loop. There is virtually no flow in the decoupler pipe 28.

The situation shown in FIG. 2 is often known as an "overpumping" situation, where the pump 32 operates at a higher flow rate than design. Also, the temperature differential over the secondary loop is 10 degrees instead of 12 degrees, which is less than design. Although this system may be work for its intended purpose, the system may strain the pump 32, or provide less than ideal cooling at the load 22.

Figure 3:
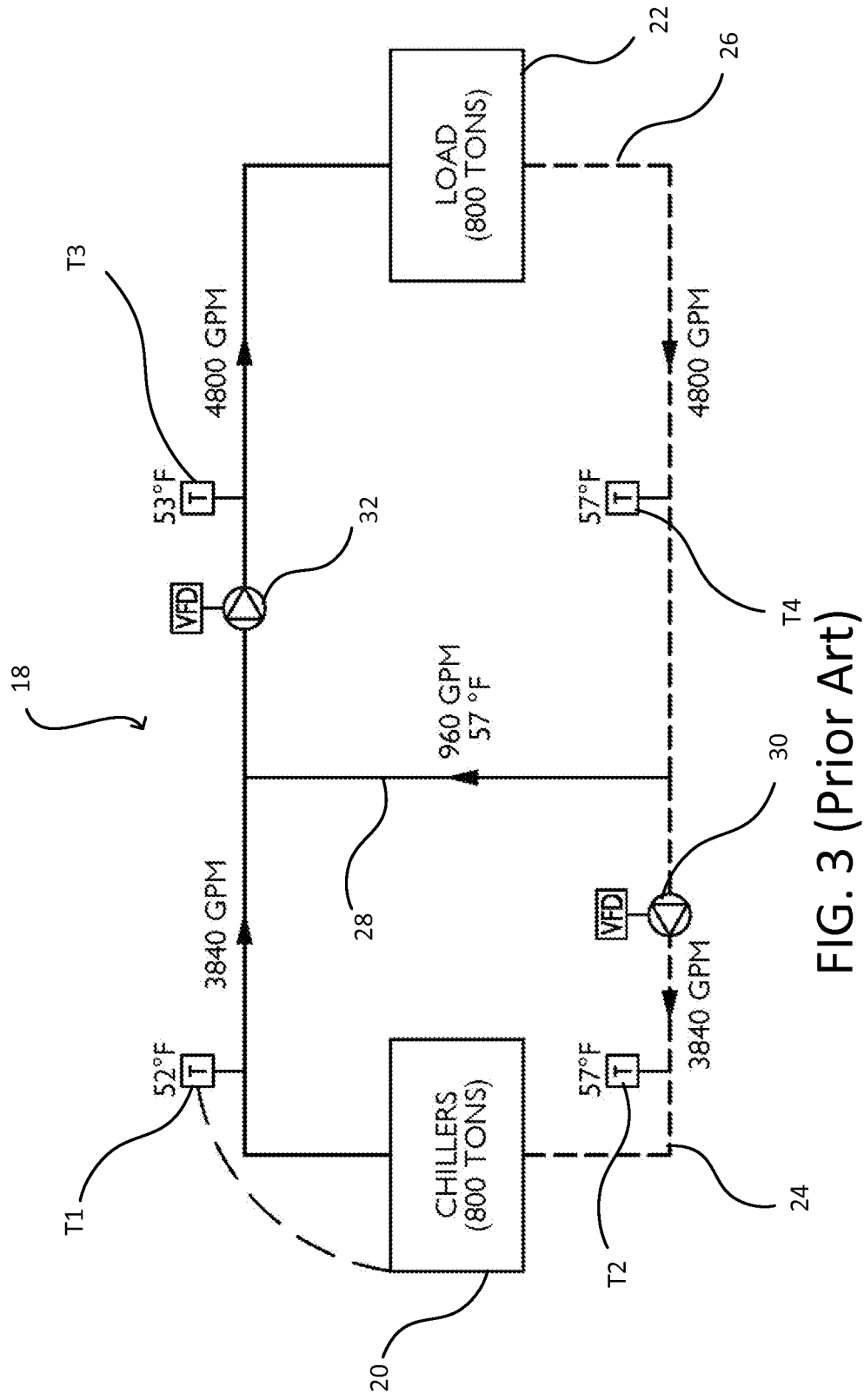
FIG. 3 is a diagrammatic representation of the system of FIG. 1, with the system in partial load and a decoupler pipe for the system in a negative state.

FIG. 3 is a prior art primary-secondary chiller plant flow design showing negative flow at the decoupler pipe 28. In this situation, flow through the decoupler pipe is moving in accordance with the arrow shown on the decoupler pipe 28, or in a negative flow direction. This phenomenon occurs often because of a low load situation, such as when very little cooling is needed at the load 22. Although the chillers 20 are still producing and operating in accordance with the set temperature 52, the drop across the chillers 20 is only 5 degrees. This lower drop across the chillers 20 is due to the low temperature drop at the load 22, due to low cooling needs at the load.

To balance the cooling loads of the primary and secondary loops 24, 26, there is a larger flow rate (4800 GPM) through the secondary loop than the primary loop (3840). This situation results in water flowing in a negative direction through the decoupler pipe 28, ultimately mixing with water from the chillers 20 before being pumped to the load 22. Because the water in the decoupler pipe 28 is warmer than the supply water from the chillers 20, the resulting water pumped to the load 22 is higher in temperature than in the partial and full load systems shown in FIGS. 1 and 2. This higher temperature is indicated by the temperature 53° F. at T3 in FIG. 3. This higher temperature at the supply side of the secondary loop 26 lowers $\Delta T$ on the load 22, requiring higher flow rates in the secondary loop 26 to balance the system. As such, the pump 32 continues to work harder. This process continues, and low delta-T syndrome results. This low delta-T syndrome results in greater pump, chiller, and cooling tower energy consumption, and a reduction in cooling plant capacity. Often, in prior art designs, to overcome low delta-T syndrome, one or more additional chillers are added in parallel at the chillers 20 so that the flow rate can be increased in the primary loop until positive flow in the decoupler pipe 28 is attained.

Figure 4:
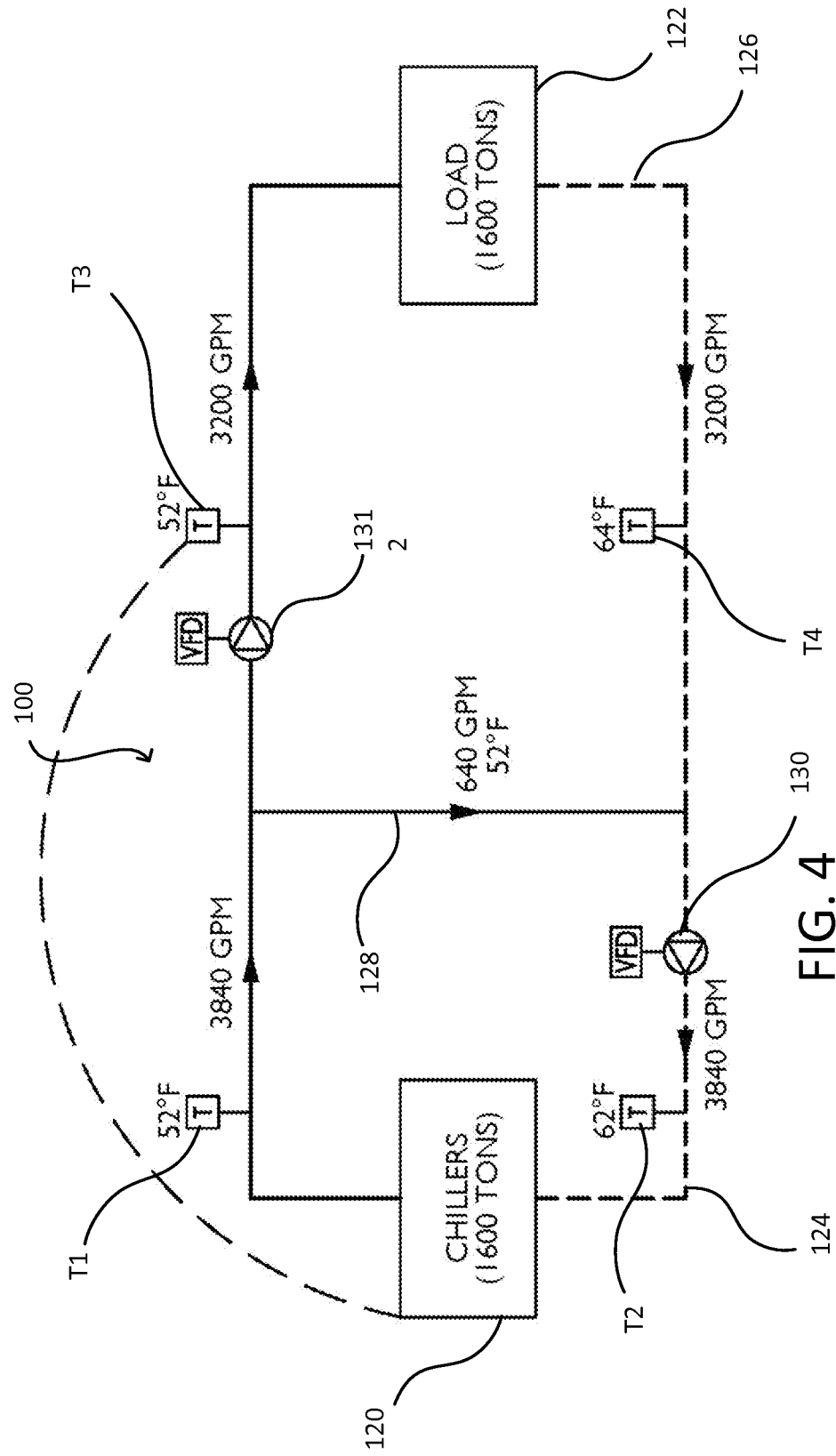
FIG. 4 is a diagrammatic representation of a primary-secondary flow design for a chiller plant system in accordance with embodiments, with the system fully loaded.

FIG. 4 is a diagrammatic representation of a primary-secondary chiller plant flow design 100 in accordance with embodiments. The components of the system in FIG. 4 are the same as or similar to those in FIGS. 1-3, and similar numerals are used to represent the elements, with the addition of 100 to each element in FIG. 4 for the respective element in FIG. 3. Thus, the primary loop 24 of FIG. 1 becomes the primary loop 124 of FIG. 4, and so forth.

In contrast to the systems described with reference to FIGS. 1-3, the system 100 in FIG. 4 utilizes a set point temperature that is measured from the supply temperature of the secondary loop 126. A set point temperature is the point, or points, at which a thermostat in a cooling system is set, with that temperature being the temperature toward which the system is controlled. Thus, the set point temperature is measured at or near T3 in FIG. 4. Thus, a set point temperature is generated or selected for this position, and the chillers 120 operate to produce chilled water to maintain that position at the set point temperature. Although T3 is positioned downstream of the pump 131, T3 can be measured upstream of the pump or anywhere between the junction of the primary and secondary loops 124, 126 and the load 122. In addition, as described below, information from the secondary loop 126 other than the supply temperature at the load can be used for a set temperature for the chillers 20.

Figure 5:
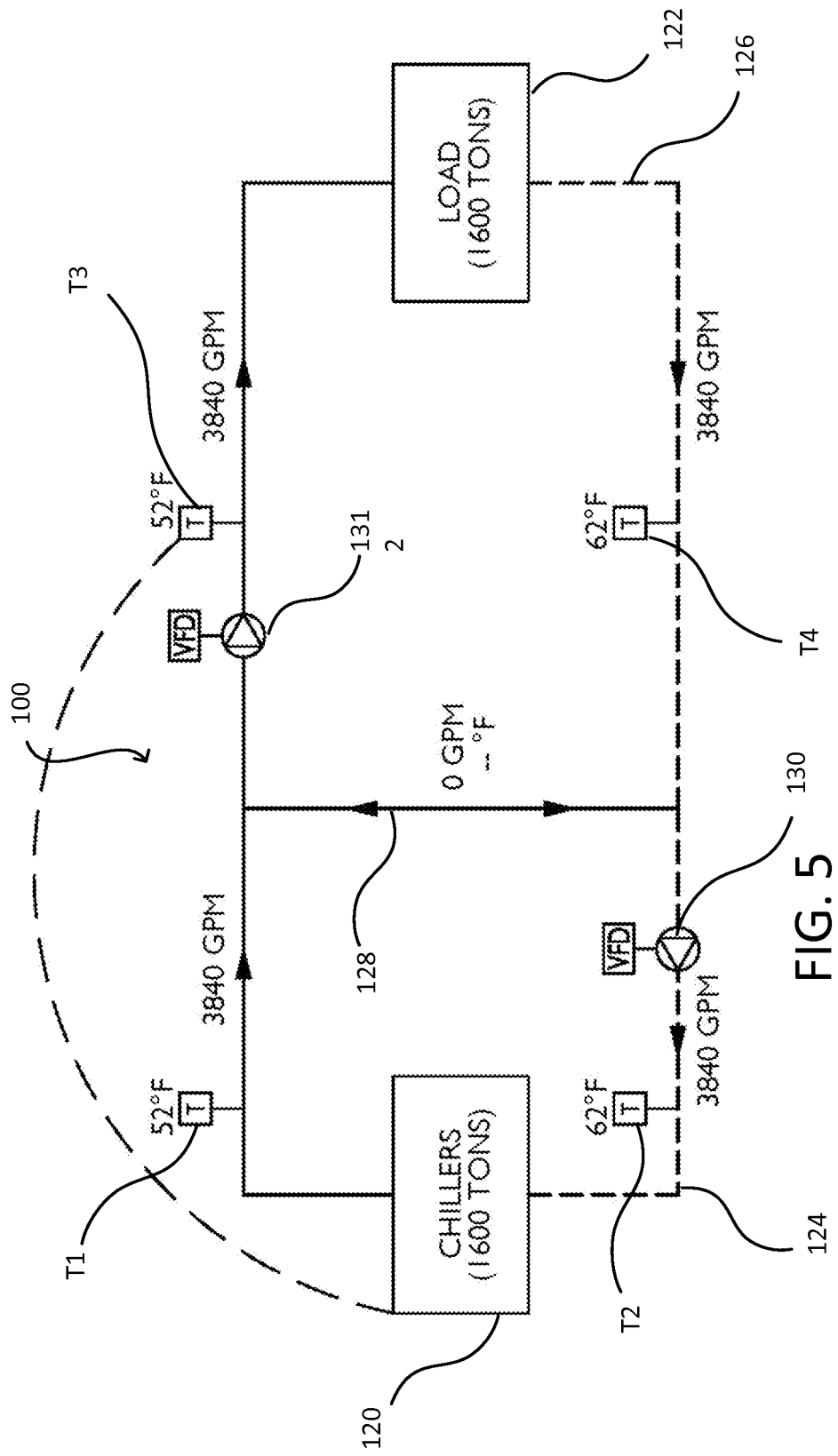
FIG. 5 is a diagrammatic representation of the system of FIG. 4, with a decoupler pipe for the system in a neutral state.

By utilizing the supply temperature at the load 22 or other information in the secondary loop 126 as the set temperature for the chillers 20, the chillers 20 may be reactive to the flow of water in the decoupler pipe 28, and may lower the temperature of the water produced by the chillers 120 accordingly. For FIG. 4, the system 100 is operating at full load, so there is little adjustment relative to the system shown in FIG. 1. Similarly, with neutral flow through the decoupler pipe 128, as shown in FIG. 5, there is little difference in the output of the chiller because the temperature at the supply of the secondary loop 126 does not change.

Figure 6:
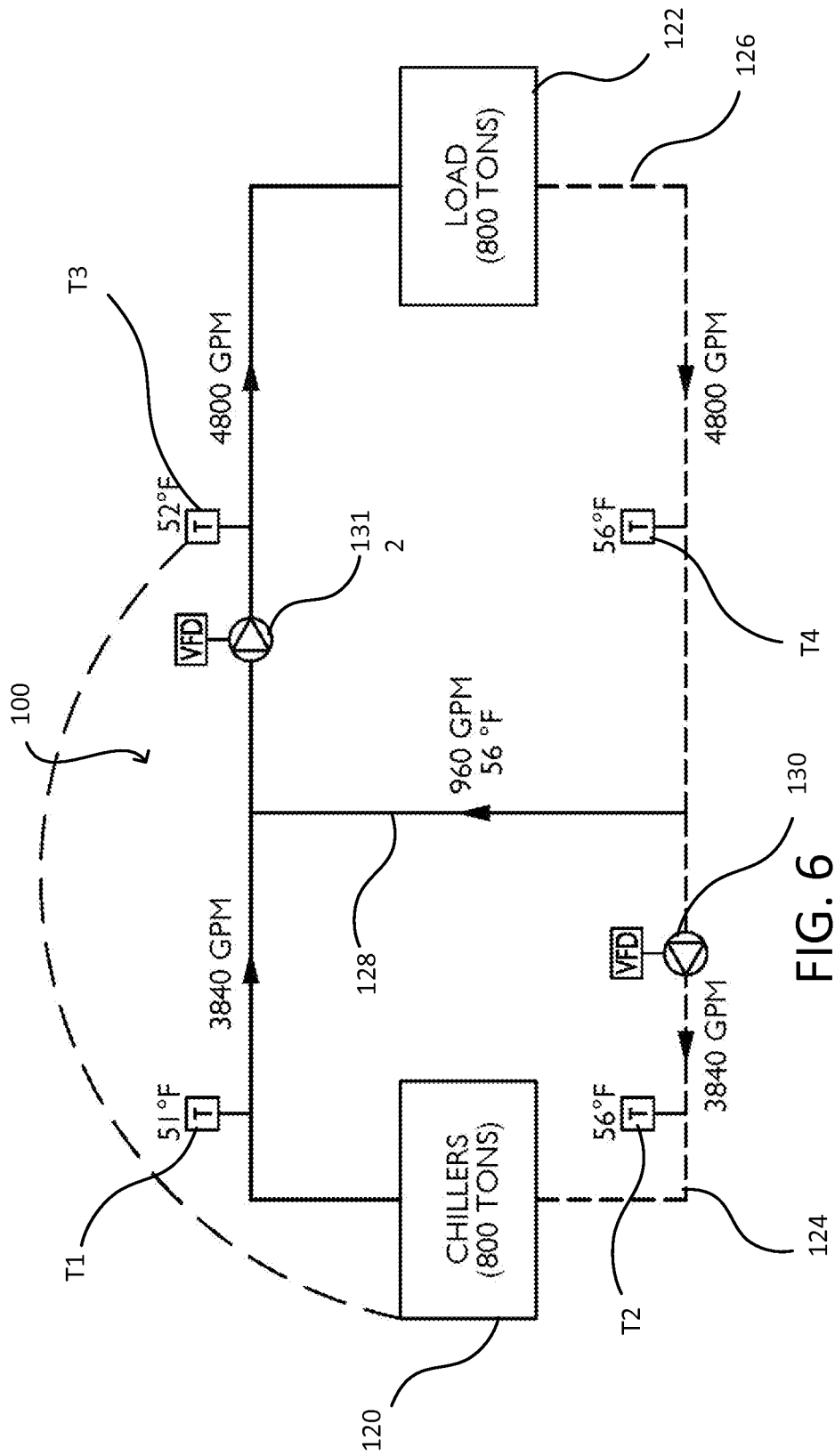
FIG. 6 is a diagrammatic representation of the system of FIG. 4, with the system in partial load and a decoupler pipe for the system in a negative state.

However, in a negative flow situation, such as is shown in FIG. 6, the negative flow of water through the decoupler pipe 128 causes the temperature of water recirculated to the supply side of the secondary loop 126 to be higher than it would be without this circulation. To account for this, and to maintain the supply side temperature of the secondary loop 126 at the appropriate temperature for the load 122 (in this example, 52° F.), the chillers 120 can operate at a lower temperature to create a greater ΔT in the primary loop, permitting the pump 131 to operate at a lower level. In the example shown in FIG. 6, this lower temperature is 51° F. By utilizing a set temperature measured at T3, the chillers 120 appropriately automatically adjust to provide the proper supply side temperature for water entering the load 122.

Figure 7:
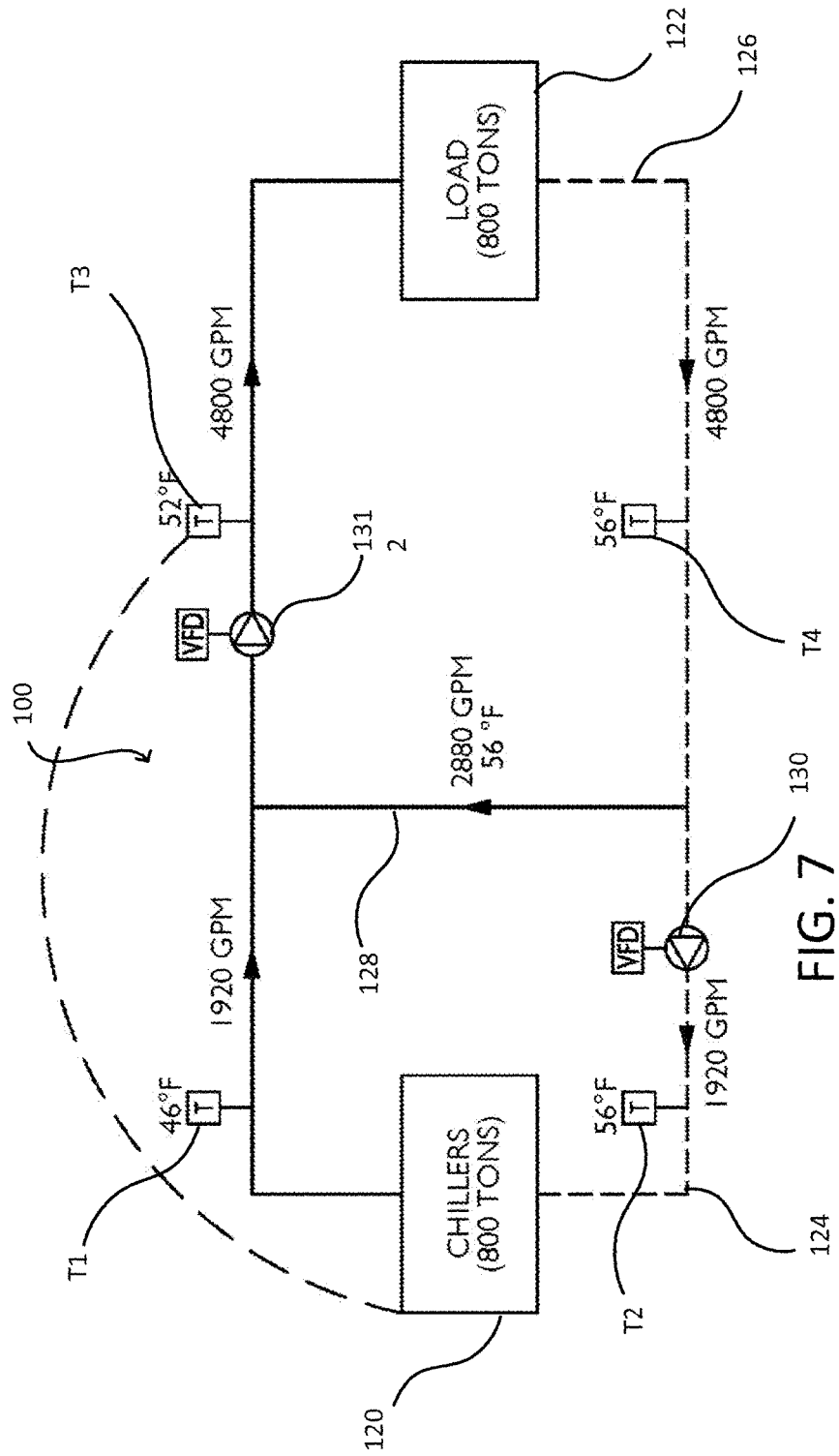
FIG. 7 is a diagrammatic representation of the system of FIG. 6, with the system in even less load.

FIG. 7 shows even a lower load situation imposed on the system 100. In this situation, the lower load is countered by a much lower output/supply temperature T1 (in the example shown, 46 degrees Fahrenheit) from the chillers 120, and lower flow rate (1920 GPM) by the pump 130. These two changes in the primary loop 124 permit the secondary loop to operate without overworking the pump 131.

By adjusting the set point of the chillers 120 to address secondary loop supply temperatures, low delta-T syndrome can be avoided. Instead of an over-pumping situation occurring in the secondary loop, where the pump 132 continues to flow water in the secondary loop at a faster and faster rate to account for lower and lower delta-T, the supply temperature of water from the chillers 120 is dropped to address negative warm water flow from the decoupler pipe 128.

Thus, as ΔT decreases on the secondary loop 126 as a result of a partial load on the load 122, the temperature T1 of the supply water from the chillers 120 can be decreased to raise ΔT on the primary loop. This decrease in temperature provides cooled water to offset the increase in temperature, caused by warm water flowing from the decoupler pipe 128, at the supply side T3 of the load 122 provided, thus raising ΔT on the secondary loop 126.

Unlike prior art designs, the set temperature for the chillers 120 is determined from at least some information from the secondary loop 126. Thus, information from the secondary loop 126 is taken into account when determining the output or supply temperature of the chillers 120. As an alternate to measuring the supply temperature of the secondary loop 126, information about the cooling load of the secondary loop 126 can be utilized or calculated utilizing measurements or other information from the system 100. As an example, if the flow rate and temperature of the decoupler pipe 128 and the supply pipe from the primary loop 124 are known, then the supply loop temperature can be calculated. Many other measurements can be taken to provide information about ΔT and/or flow conditions of the secondary loop 126, and this information can be used to control the chillers 120 within the operating parameters of the chillers.

Although the description herein describes primary and secondary loops, as is known, tertiary and other loops may be included in a chilled water system. To this end, aspects herein may be utilized to operate chillers or a chiller plant, such as the chillers 120, utilizing supply temperature information or other information for any load in the system.

Figure 8:
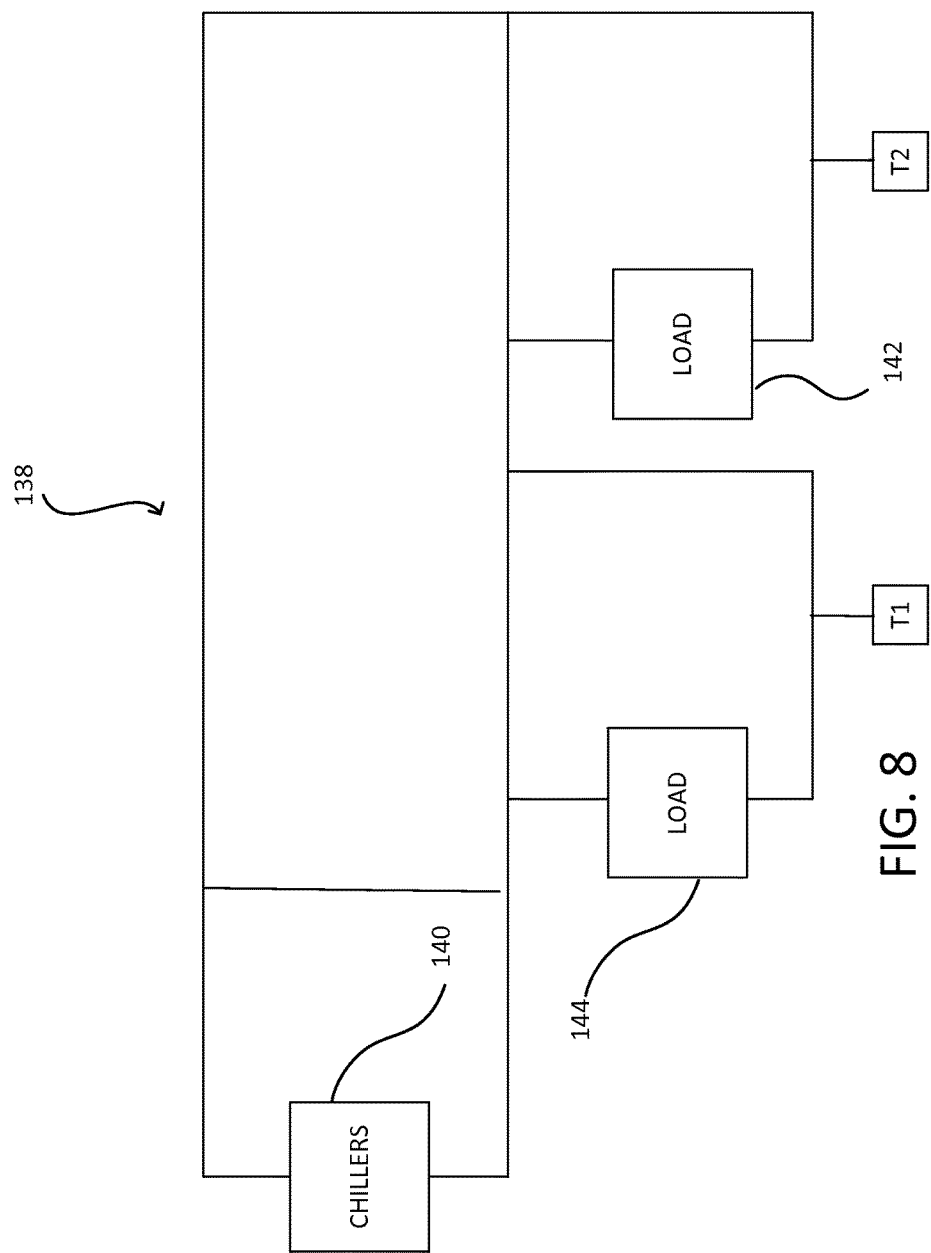
FIG. 8 is a diagrammatic representation of a primary-multiple load flow design for a chiller plant system in accordance with embodiments.

As an example, FIG. 8 shows a system 138 having a plurality (in this case two, but more than two could be used) of loads 142, 144, in parallel in a system. These loads 142, 144 are cooled by chillers 140. For this system 138, the set temperature for the chillers 140 can be T1 (in the loop with load 142), T2 (in the loop with 144), an average of these two, or some variable that takes or more of the temperatures T1, T2 into account, or takes into account other information regarding the loops for the loads 142, 144.

Calculation or determination of a set temperature by measuring temperature at the input of a load can take into account temperature drop from the chillers 140 to a load, such as the load 142. This information can be helpful when the load 142 is distanced significantly from the chillers 120, such as on a university campus.

Figure 9:
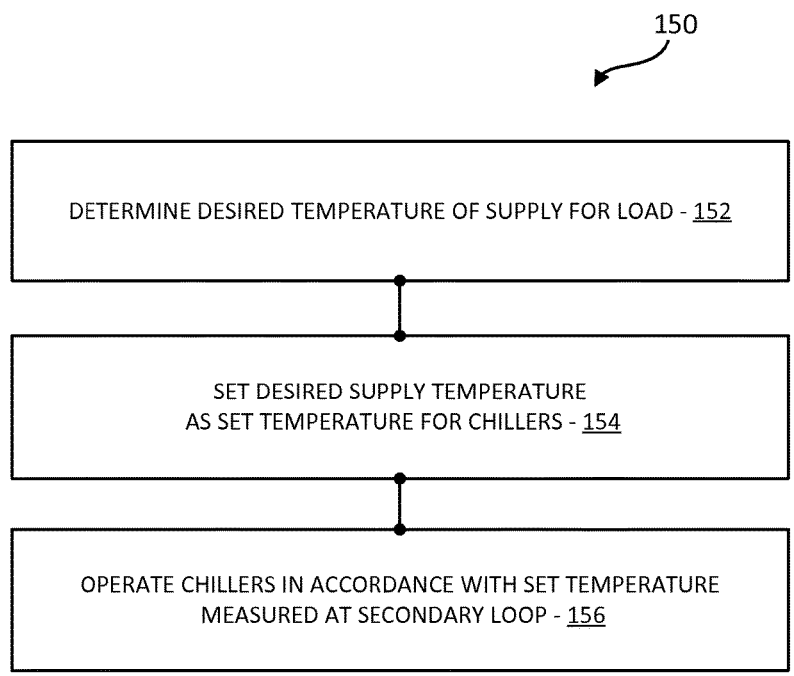
FIG. 9 is a simplified block diagram of a method, in accordance with many embodiments, for controlling a chiller.

FIG. 9 illustrates acts of a method 150 for controlling the chillers 120, in accordance with many embodiments. The method 150 can be practiced in conjunction with the systems described herein.

In act 152, a desired temperature for the supply water for the load 122 is determined. This desired temperature may be calculated in accordance with methods known in the prior art, and in general is calculated in accordance with the desired ΔT across the load 122. Alternatively, the desired temperature may be calculated in accordance with a desired temperature of the supply water to the load 122.

At act 154, the desired supply temperature is designated as the set temperature for the chillers 120. At act 156, the chillers are operated in accordance with the set temperature, with measurements taken at the secondary loop, for example at the supply side of the load 122. As described above, this operation may involve dropping the temperature of supply water from the chillers so as to account for a negative flow situation in the decoupler pipe 128.

Some or all of the method 150 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
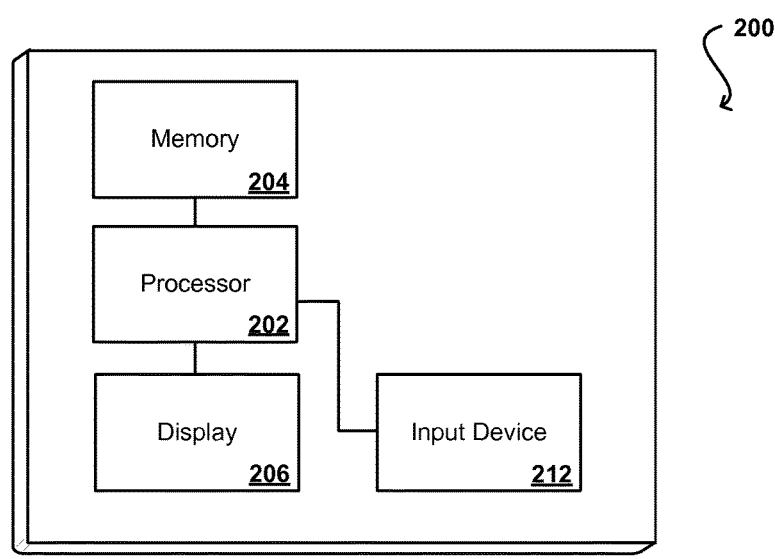
FIG. 10 illustrates an environment in which various embodiments can be implemented.

Operations herein can be performed via a computing system, including one or more motor and device controllers for operating the components of the system described herein. FIG. 10 illustrates a set of basic components of a computing device 200 that may be used for such functions. Although a single computing device is shown, the operations of the computing device 200 may be distributed over multiple computing devices, and one or more of the computing devices may be located remotely. In this example, the device includes a processor 202 for executing instructions that can be stored in a memory device or element 204. As would be apparent to one of ordinary skill in the art, the device can include many types of memory, data storage, or computer-readable media, such as a first data storage for program instructions for execution by the processor 202, a separate storage for images or data, a removable memory for sharing information with other devices, etc. The device typically can include some type of display element 206, such as a touch screen or liquid crystal display (LCD), although devices such as motor controllers might operate without a display. The devices herein can also include an input device 212 able to receive conventional input and commands from a user, such as a technician or an operator. This conventional input can include, for example, a push button, touch pad, touch screen, wheel, joystick, keyboard, mouse, keypad, or any other such device or element whereby a user can input a command to the device. In some embodiments, however, such a device might not include any local input devices at all, and might be controlled remotely through another computer system, as an example.

As previously described, various embodiments can be further implemented in a wide variety of operating environments, which in some cases can include one or more user computers or computing devices which can be used to operate any of a number of applications or software instructions. User or client devices used to program and maintain the instructions herein can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, and other devices capable of communicating via a network.

Embodiments that utilize a network that would be familiar to those skilled in the art for can support communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A computer-implemented method for controlling operation of one or more chillers in a primary-secondary chiller plant system, the primary-secondary chiller plant system comprising a primary loop including said one or more chillers and a secondary loop comprising a load, the method comprising:
   under the control of one or more computer systems configured with executable instructions,
      controlling operation of the primary-secondary chiller plant system to pump water at a secondary loop flow rate through the secondary loop and a primary loop flow rate through the primary loop, the secondary loop flow rate being greater than the primary loop flow rate;
      determining a desired set temperature for water in the secondary loop at a supply side of the load for the operation of the primary-secondary chiller plant system to pump water at the secondary loop flow rate through the secondary loop and the primary loop flow rate through the primary loop based on a desired change in temperature for the water across the load;
      measuring a temperature of water in the secondary loop at the supply side of the load;
      determining a difference between the measured temperature and the desired set temperature; and
      controlling operation of the one or more chillers based upon the difference between the measured temperature and the desired set temperature to output supply water at the primary loop flow rate from said one or more chillers at a temperature to drive the temperature of water flowing in the secondary loop at the secondary loop flow rate and at the supply side of the load to the desired set temperature.

2. The computer-implemented method of claim 1, wherein said measuring occurs at a position between the secondary loop pump and the load.

3. The computer-implemented method of claim 1, further comprising:
   under the control of one or more computer systems configured with executable instructions,
      measuring an updated temperature of water in the secondary loop at the supply side of the load;
      determining a difference between the updated measured temperature and the desired set temperature; and
      controlling operation of the one or more chillers based upon the difference between the updated measured water temperature and the desired set temperature to drive the temperature of water in the secondary loop at the supply side of the load to the desired set temperature.

4. A computer-implemented method for controlling operation of one or more chillers in a chiller plant system, the chiller plant comprising a primary loop including said one or more chillers and a load loop comprising a load, the method comprising:
   under the control of one or more computer systems configured with executable instructions,
      controlling operation of the chiller plant system to pump water at a load loop flow rate through the load loop and a primary loop flow rate through the primary loop, the load loop flow rate being greater than the primary loop flow rate;
      measuring information regarding a cooling load on the load loop;
      determining a desired set temperature for water in the load loop at a supply side of the load for the operation of the chiller plant system to pump water at the load loop flow rate through the load loop and the primary loop flow rate through the primary loop based on the information regarding the cooling load;
      measuring a temperature of water in the load loop at the supply side of the load;
      determining a difference between the measured temperature and the desired set temperature; and
      controlling operation of the one or more chillers based upon the difference between the measured temperature and the desired set temperature to output supply water at the primary loop flow rate from said one or more chillers at a temperature to drive the temperature of water flowing in the load loop at the load loop flow rate and at the supply side of the load to the desired set temperature.

5. The computer-implemented method of claim 4, wherein the load loop measured information comprises a temperature at a supply side of the load and on the load loop.

6. The computer-implemented method of claim 4, wherein the load loop comprises a second load loop including a second load, the method further comprising:
under the control of one or more computer systems configured with executable instructions,
measuring second load loop information regarding a second cooling load on the second load loop; and
operating said at least one chiller based upon the measured second load loop information.

7. The computer-implemented method of claim 6, wherein operating said one or more chillers comprises outputting supply water from said one or more chillers based upon an average of said measured second load loop information and said measured load loop information.

8. The computer-implemented method of claim 6, wherein the load loop measured information comprises a temperature at a supply side of the load and on the load loop and wherein the second load loop measured information comprises a temperature at a supply side of the second load and on the second load loop.

9. A primary-secondary chiller plant system comprising:
one or more chillers;
a primary loop including the one or more chillers;
a secondary loop connected to the primary loop and for providing cooling water to a load; and
one or more computer systems configured with executable instructions to:
operate the primary-secondary chiller plant system to pump water at a secondary loop flow rate through the secondary loop and a primary loop flow rate through the primary loop, the secondary loop flow rate being greater than the primary loop flow rate;
determine a desired set temperature for water in the secondary loop at a supply side of the load for the operation of the chiller plant system to pump water at the load loop flow rate through the load loop and the primary loop flow rate through the primary loop based on information regarding the load;
measure a temperature of water in the secondary loop at the supply side of the load;
determine a difference between the measured temperature and the desired set temperature; and
operate said one or more chillers based upon the difference between the measured temperature and the desired set temperature to output supply water at the primary loop flow rate at a temperature to drive the temperature of water flowing in the secondary loop at the secondary loop flow rate on the supply side of the load to the desired set temperature.

10. The system of claim 9, wherein the water temperature is measured at a position between the secondary loop pump and the load.

11. The system of claim 9, wherein the one or more computer systems are configured with executable instructions to:
measure an updated temperature of water in the secondary loop at the supply side of the load; and
operate said one or more chillers based upon the updated measured water temperature.

12. A chiller plant system comprising:
one or more chillers;
a primary loop including said one or more chillers;
a load loop connected to the primary loop and for providing cooling water to a load;
one or more computer systems configured with executable instructions to:
operate the chiller plant system to pump water at a load loop flow rate through the load loop and a primary loop flow rate through the primary loop, the load loop flow rate being greater than the primary loop flow rate;
measure load loop information regarding a cooling load on the load loop;
determine a desired set temperature for water in the load loop at a supply side of the load for the operation of the chiller plant system to pump water at the load loop flow rate through the load loop and the primary loop flow rate through the primary loop based on the measured load loop information regarding the cooling load; and
control operation of said at least one chiller to output supply water at the primary loop flow rate from said one or more chillers at a temperature to drive the temperature of water flowing in the load loop at the load loop flow rate and at the supply side of the load to the desired set temperature.

13. The system of claim 12, wherein the load loop measured load loop information comprises a temperature at the supply side of the load and on the load loop.

14. The system of claim 12, wherein the load loop comprises a second load loop including a second load, and wherein the instructions are further operable to cause the one or more computer systems to:
measure second load loop information regarding a second cooling load on the second load loop; and
control operation of said at least one chiller based upon the measured second load loop information.

15. The system of claim 14, wherein the operation of the one or more chillers is controlled based upon an average of the measured second load loop information and the measured load loop information.

16. The system of claim 14, wherein the measured load loop information comprises a temperature at the supply side of the load and on the load loop and wherein the measured second load loop information comprises a temperature at a supply side of the second load and on the second load loop.

* * * * *